Patented Sept. 26, 1922.

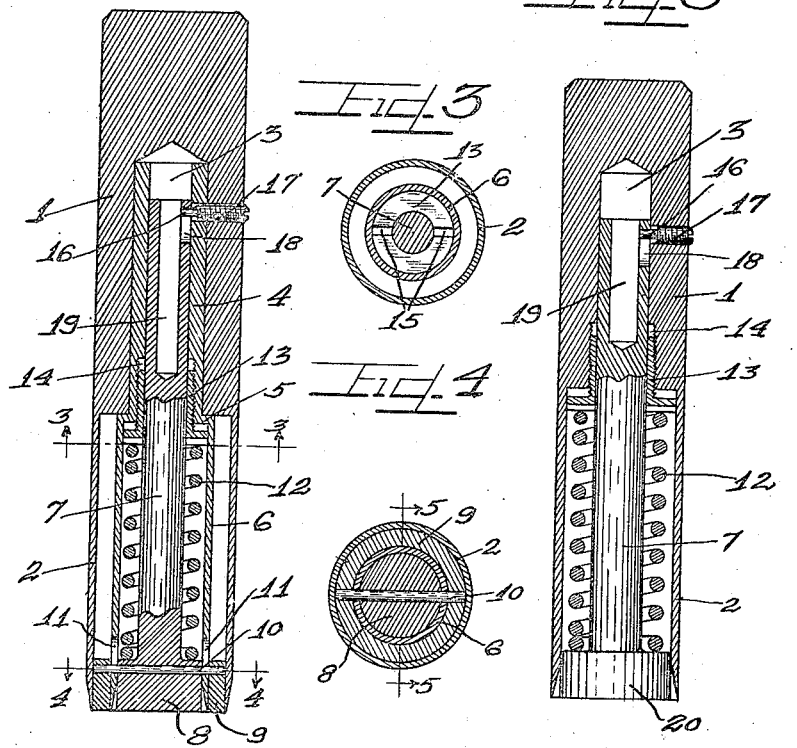

1,430,373

UNITED STATES PATENT OFFICE.

CHARLES H. HENNINGS, OF CHICAGO, ILLINOIS.

GASKET CUTTER.

Application filed August 17, 1921. Serial No. 492,926.

*To all whom it may concern:*

Be it known that I, CHARLES H. HENNINGS, a citizen of the Republic of Chile, and a resident of the city of Chicago, in the county of Cook and State of Illinois, have invented certain new and useful Improvements in a Gasket Cutter; and I do hereby declare that the following is a full, clear, and exact description of the same, reference being had to the accompanying drawings, and to the numerals of reference marked thereon, which form a part of this specification.

This invention relates to a gasket cutter, and particularly to a device which is adapted to be used to cut properly formed gaskets, washers and similar articles from sheets of suitable material with a single operation.

It is an object of this invention to provide a cutting device of the class described which will cut the article to the proper form and automatically eject the same after it is cut from a sheet of stock material.

It is a further object of this invention to provide a gasket-cutting device having a spring-impelled ejector.

It is an important object of this invention to provide an improved cutter device of the class described having an adjustable automatic ejector mechanism, and being adapted to economical manufacture and convenient assembly.

Other and further important objects of this invention will be apparent from the disclosures in the specification and the accompanying drawings.

The invention (in a preferred form) is shown on the drawings and hereinafter more fully described.

On the drawings:

Figure 1 is a central vertical section with parts in elevation showing a gasket cutting device embodying the principles of this invention.

Figure 2 is a bottom plan view of the device.

Figure 3 is a section on the line 3—3 of Figure 1.

Figure 4 is a section on the line 4—4 of Figure 1.

Figure 5 is a section on the line 5—5 of Figure 4.

Figure 6 is a view similar to Figure 1, showing a device embodying a single cutter.

Figure 7 is a bottom plan view of the device shown in Figure 6.

As shown on the drawings:

The cutter device of this invention is provided with a handle 1, and integrally formed on or otherwise secured to one end of said handle is a cylindrical cutter portion 2. Said handle 1 is provided with an axial cylindrical recess 3, and engaged in said recess 3 is a tube 4 which extends downwardly therein to the inner end of the handle 1 where a flange 5 which is integral with said cylindrical portion extends outwardly therefrom and abuts the end of said handle. Integrally formed on said flange 5 and extending axially inside the cutter 2 is an inner cylindrical cutter member 6, which is separated from the inner side of the cutter 2 by a distance equal to the width of the gasket or washer required. Slidably mounted inside the cylindrical member 4 and extending axially through the cutter 6 is a rod 7 which has a plunger member 8 formed on its lower end, said plunger or ejector member 8 being slidable in the lower end of the cutter member 6 and being adapted to eject cut out material from the stock sheets and from said cutter.

Said plunger 8 is connected with an annular plunger or ejector member 9, which is slidable between the lower ends of the cutters 2 and 6, by means of a transverse rod 10, which extends through the plunger 8 and outwardly through slots 11 in the cutter 6 into said plunger 9. The ejector plungers 8 and 9 are resiliently held downwardly in position adjacent the cutting edges of the cutters 2 and 6 by means of a helical spring 12 which is engaged between the upper side of the plunger 8 and the flanged end of an adjusting collar 13 which is engaged around the rod 7 and which may be adjusted vertically in a threaded recess 14 formed in the cylindrical member 4. Slots or notches 15 formed in the flange on the adjusting collar 13 afford means whereby the same may be engaged by a suitable tool and rotated for eccentric adjustment in the recess 14. The relative vertical movement of the ejector plungers 8 and 9 and of the rod 7 is limited by a stop 16 which is formed on the inner end of a set screw 17 extending through the handle 1 and the cylindrical member 4 into a longitudinal slot 18 which is formed in the upper end of said rod 4 adjacent a longitudinal recess 19 therein.

Figures 6 and 7 illustrate a single gasket cutter which is constructed according to the principles of this invention and which is particularly used for cutting washers, small disks and the like. In this construction the inner cutter 6 is omitted, and the plungers 8 and 9 are replaced by a plunger 20 which is formed on the lower end of the rod 7 and which extends outwardly through the inner wall of the cutter 2. The device is conveniently assembled by properly positioning the inner cutter 6 and the ejector mechanism which is supported thereon and inserting this inner cutting mechanism into said recess 3 in the handle 1, after which the set screw 17 may be inserted, the mechanism being so positioned that the stop 16 on said set screw is engaged in the slot 18 in the upper end of the rod 7. At the time when this assembly is effected, and before the rod 7 is moved into position, the adjusting collar 13 should be adjusted to the proper vertical position to maintain the desired amount of compression on the helical spring 12, and in case that the spring 12 becomes weakened, said adjusting collar may of course be again adjusted to increase the compression thereof.

The device is used in much the same manner as the ordinary hand punch, and after the cutting blow is struck, the finished washer or gasket is automatically ejected from the device by the action of the spring on the plungers 8 and 9 or on the plunger 20. The device is particularly adapted for and will operate satisfactorily in the cutting of gasket composition material, rubber, cork, fibrous material, lead, and a variety of other materials which need not be enumerated. On account of the few simple and strong parts, there is little likelihood of the device getting out of order, and the provision of the improved ejector mechanism greatly facilitates the cutting of the gaskets, washers and the like from sheets of stock material.

I am aware that numerous details of construction may be varied through a wide range without departing from the principles of this invention, and I therefore do not purpose limiting the patent granted otherwise than necessitated by the prior art.

I claim as my invention:

1. A device of the class described comprising a handle member, a cutter thereon, a second cutter coaxial with the first cutter and supported by the handle member, a rod slidably mounted in the second cutter, an ejector-plunger on the rod slidable in the end of said second cutter, a second ejector-plunger slidable between the first and second cutters and connected to said first mentioned ejector-plunger for movement therewith, and a helical spring inside the second cutter for normally forcing said plungers outwardly.

2. A device of the class described comprising a handle member, a cutter thereon, a second cutter coaxial with the first cutter and supported by the handle, an ejector-plunger slidable in the end of the first cutter, a second ejector-plunger slidable between the first and second cutters and connected to said first mentioned ejector plunger for movement therewith, a spring for normally forcing said plunger outwardly, and a stop for limiting the movement of the plungers relative to the cutters.

3. A device of the class described comprising a handle member, a cutter thereon, a second cutter coaxial with the first cutter and supported by the handle member, a rod slidably mounted in the second cutter, an ejector-plunger on the rod slidable in the end of the first cutter, a second ejector-plunger slidable between the first and second cutters and connected to said first mentioned ejector-plunger for movement therewith, a helical spring for normally forcing said plungers outwardly, and means for varying the compression on said helical spring.

4. A device of the class described comprising a handle member, a cutter thereon, a second cutter coaxial with the first cutter and supported by the handle, a rod slidably mounted in the second cutter, an ejector-plunger on the rod slidable in the end of the first cutter, a second ejector-plunger slidable between the first and second plungers and connected to the first mentioned ejector-plunger for movement therewith, a helical spring inside the second cutter for normally forcing said plungers outwardly, and a vertically adjustable member inside the second cutter for varying the compression on the spring.

5. A device of the class described comprising a handle member, a cutter thereon, a second cutter coaxial with the first cutter and supported by the handle, a rod slidably mounted in the second cutter, an ejector-plunger on the rod slidable in the end of the first cutter, a second ejector plunger slidable between the first and second cutters, and resilient means for normally forcing said plungers outwardly.

6. The combination with a gasket cutter, of ejector means operable therein, a spring actuating means for said ejector means, and means for adjusting the action of said actuating means.

In testimony whereof I have hereunto subscribed my name in the presence of two subscribing witnesses.

CHARLES H. HENNINGS.

Witnesses:
CARLTON HILL.
JAMES M. O'BRIEN.